(12) United States Patent
Otana

(10) Patent No.: US 6,636,688 B1
(45) Date of Patent: Oct. 21, 2003

(54) VIDEO RECORDING DEVICE

(75) Inventor: Hiroshi Otana, Ikoma (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/310,384

(22) Filed: May 12, 1999

(30) Foreign Application Priority Data

May 13, 1998 (JP) ............................................. 10-129914
Sep. 7, 1998 (JP) ............................................. 10-252868

(51) Int. Cl.⁷ ............................................... H04N 5/91
(52) U.S. Cl. .......................................... 386/83; 386/94
(58) Field of Search ................................ 386/83, 46, 1, 386/94, 95; 725/86, 87, 101, 102; 360/13, 15; H04N 5/91

(56) References Cited

U.S. PATENT DOCUMENTS 6,078,360 A * 6/2000 Doornhein et al.
6,144,401 A * 11/2000 Casement et al.

FOREIGN PATENT DOCUMENTS

| JP | 63-64653 | 3/1988 |
| JP | 63-148784 | 6/1988 |
| JP | 2-49246 | 2/1990 |
| JP | 2-140085 | 5/1990 |
| JP | 6-162602 | 6/1994 |
| JP | 09/044931 | 2/1997 |
| JP | 09-259485 | 10/1997 |
| JP | 10-117331 | 5/1998 |

* cited by examiner

Primary Examiner—Robert Chevalier
(74) Attorney, Agent, or Firm—Armstrong, Westerman & Hattori, LLP

(57) ABSTRACT

The invention provides a video recording device which comprises a tuner 11 for receiving television broadcast signals, an XDS signal extracting circuit 13 for extracting an XDS signal from the received television broadcast signal, a key input unit 15 for inputting RATING information, etc. required for recording a preselected program, a remote control transmitter 17, a memory 18 for storing the input information, and a control circuit 14. The control circuit 14 compares the input RATING information with RATING information contained in the XDS signal and starts a recording operation when a match is found between the compared pieces of information. The control circuit 14 terminates the recording operation when a change occurs in the RATING information in the XDS signal and/or title information. Even if the program broadcast starting time or broadcast termination time is changed, the recording of the preselected program can be started or completed by the device in conformity with he change in time.

3 Claims, 11 Drawing Sheets

FIG. 9

|  | CH | DATE | START | END | TITLE |
|---|---|---|---|---|---|
| | | | RECORDING LIST | | |
| 1. | — | — | — | — | SOCCER |
| 2. | — | — | — | — | ENGLISH CONVERSATION |
| 3. | 15 | 11/24 | 7:00PM | 8:00PM | — |
| 4. | — | — | — | — | NEWS |
| 5. | 17 | 5/12 | 9:00PM | 10:00PM | — |

| | RECORDING LIST | | | |
|---|---|---|---|---|
| | CH | DATE | START | END |
| 1. | 22 | 11/12 | 10:15AM | 10:30AM |
| 2. | 38 | 11/15 | 9:00PM | 11:00PM |
| 3. | 15 | 11/24 | 7:00PM | 8:00PM |
| 4. | 17 | 5/5 | 9:00PM | 11:00PM |
| 5. | 17 | 5/12 | 9:00PM | 10:00PM |

VIDEO RECORDING DEVICE

FIELD OF THE INVENTION

The present invention relates to video recording devices, such as VCRs (video cassette recorders) and video disk players, for receiving a television broadcast signal and recording the signal on a recording medium, and more particularly to video recording devices which are adapted to record on a recording medium a television broadcast signal having viewing prohibition information or title information superposed thereon.

BACKGROUND OF THE INVENTION

In order to meet differences in program broadcasting hours in Europe, it is conventional practice to control unattended recording of a preselected television program by superposing a control signal termed a VPS (video programming system) signal on the television signal.

It is also practice in North America to control recording of a preselected television program by super-posing a control signal conforming to the XDS (Extended Data Service) standard on the 21st horizontal section of vertical blanking period in the second field of the television broadcast signal.

In either of these methods, a special control signal for controlling the video recording operation needs to be transmitted as superposed on the television broadcast signal.

In North America, regulations called V-chip are to be formulated into a law to prevent children from viewing TV (television) programs for adults which contain presentations involving violence or sexual expression. According to the V-chip regulations, the television broadcast signal for each program must have superposed thereon viewing prohibition information termed "RATING" and relating to the age limit for viewing, wording, etc. Further it is recommended that title information representing the titles of the programs be superposed on the television broadcast signal along with the RATING information. The RATING information, as well as the title information, is therefore transmitted as superposed on the television broadcast signal as part of the XDS signal (see "EIA STANDARD" EIA-608-1994 ELECTRONIC INDUSTRIES ASSOCIATION).

VCRs are already known which have the function of displaying as a recording list recording information as to all the programs recorded on a magnetic tape as shown in FIG. 14.

For use with the VCR of this type, the magnetic tape is provided thereon with a recording region for the television broadcast signal and an auxiliary data recording region narrower than the region as shown in the signal recording format of FIG. 13. Recorded in the auxiliary data recording region after the start of recording are first VISS (video index signal search) data representing the recording starting time, and subsequently VASS (video address signal search) data including user data and recording data representing the contents of the recording. The recording data includes data relating, for example, to the channel number, recording date, recording starting time and recording termination time.

When the VCR is manipulated by the user to display the list, the magnetic tape is forwarded fast for playback to read the recording data from the VASS data recording section of the auxiliary data recording region. A recording information display signal is prepared with reference to the read recording data and fed to a TV receiver. As a result, the recording list shown in FIG. 14 is displayed on the screen of the TV receiver. In the drawing, "CH" means channel number, "DATE" means recording date, "START" means recording stating time and "END" means recording termination time.

However, the recording list shows the channel number, recording date, recording starting time and recording termination time only, and the title of the program is not given as seen in FIG. 14. The VCR therefore has the problem that the recording list fails to indicate what a particular program is.

To solve the problem, it appears useful to display the title of the program on the screen of the monitor utilizing the title information contained in the XDS signal.

The VCR having such a function will be so adapted that, for example, when the VCR is manipulated by the user to display a title list, the entire broadcast signal recording region shown in FIG. 13 is searched to extract pieces of title information one after another from the television broadcast signal recorded in the region and display the titles with reference to the extracted title information.

The VCR so constructed nevertheless has the problem that since the broadcast signal recording region has a large area, the extraction of titles requires much time, necessitating a long period of time for completely displaying the list of program titles.

Alternatively, the title information extracted from the television broadcast signal may be recorded in the user data recording area of the VASS data recording section, such that when the VCR is manipulated by the user for the display of titles, pieces of title information are read one after another from the user data recording area to display the titles with reference to the read title information. However, the recorder so designed has the problem that recording of the title information, which is great in quantity, requires much time.

SUMMARY OF THE INVENTION

An object of the present invention is to provide a video recording device wherein the RATING information or title information contained in the XDS signal is utilized for controlling the recording operation, so that even in the event of a change in the broadcast starting or termination time of a program, the program recording operation can be started or completed automatically in accordance with the change of the time.

The present invention provides a video recording device for recording on a recording medium television broadcast signals having RATING (viewing prohibition information) superposed thereon for each program, the device comprising:

means for receiving television broadcast signals, information separating means for separating the RATING information from the television broadcast signal received, input means for inputting information required for unattended recording of a preselected program, storage means for storing the input information, and recording start control means for comparing RATING information input by manipulating the input means with the RATING information separated from the television broadcast signal and starting a recording operation when a match is found between the compared pieces of information.

With the video recording device of the present invention, RATING information, the broadcast starting time of a preselected program, etc. required are input with use of the input means. The device then starts to monitor the RATING information a predetermined period of time before the broadcast starting time of the program, and is automatically initiated into a recording operation upon finding a match between the input RATING information and the RATING information separated from the television broadcast signal.

Accordingly, if the broadcast of the program is started later than is scheduled, a match is not obtained between the two pieces of RATING information until the broadcast of the program is actually started, permitting the device to remain in a standby state for recording. When the broadcast of the program is actually started, the two pieces of RATING information match for the start of the recording operation.

The RATING information comprises several tens of contents provided by items of data in combinations, so that two consecutive programs are least likely to be exactly identical in RATING information.

More specifically, the television broadcast signal contains title information superposed thereon for each program, and the information separating means is capable of separating the RATING information and the title information from the received television broadcast signal, and which comprises information checking means for checking the separated RATING information and/or title information for a change, and recording termination control means for terminating the recording operation when a change is found in the RATING information and/or title information separated from the television broadcast signal during recording after the start of the recording operation.

The device thus constructed starts to monitor the RATING information and/or the title information after the start of the recording operation, and automatically terminates the recording operation upon detecting a change in the RATING information and/or the title information.

Accordingly even if the broadcast of the program is completed later than is scheduled, the RATING information and the title information remain unchanged until the broadcast of the program is actually completed, and the recording operation is continued. When the broadcast of the next program is started upon actual completion of the program, the RATING information and the title information change, whereby the recording operation is terminated.

The present invention further provides a video recording device for recording on a recording medium television broadcast signals having RATING information and title information superposed thereon for each program, the device comprising:

means for receiving television broadcast signals,
   information separating means for separating the RATING information and the title information from the television broadcast signal received,
   information checking means for checking the separated RATING information and/or title information for a change, and
   recording termination control means for terminating a recording operation when a change is found in the RATING information and/or title information separated from the television broadcast signal during recording after the start of the recording operation.

After the video recording device described of the invention is initiated into an operation to record a program, for example, by a usual manual procedure, the device starts to monitor the RATING information and/or the title information and automatically terminates the recording operation upon detecting a change in the RATING information and/or the title information.

Accordingly even if the broadcast of the program is completed later than is scheduled, the RATING information and the title information remain unchanged until the broadcast of the program is actually completed, and the recording operation is continued. When the broadcast of the next program is started upon actual completion of the program, the RATING information and the title information change, whereby the recording operation is terminated.

The video recording device embodying the invention realizes unattended recording of a preselected program even when the program broadcast hours are changed by utilizing the RATING information or the title information contained in an XDS signal without necessitating other special control signal superposed on the television broadcast signal.

Another object of the present invention is to provide a video recording device which is adapted to display on a monitor a list of the titles of programs recorded on a tape.

The invention provides another video recording device for use with a television broadcast signal containing a plurality of programs and title information relating to at least one of the programs and superposed on the signal at a predetermined position, and with a tape having in combination a region for recording the television signal and a region for recording auxiliary data, the video recording device being adapted to record the television broadcast signal of the plurality of programs in the broadcast signal recording region. The video recording device is characterized in that the device comprises:

first information processing means for writing a flag relating to the program containing the title information and indicating the presence of the title information to the auxiliary data recording region in the course of recording the plurality of programs, and
   second information processing means for extracting the title information relating to the program for which the flag is written to the auxiliary data recording region from the predetermined position of the television signal to be reproduced from the broadcast signal recording region, and preparing and outputting data for visually displaying the extracted title information, when the device is manipulated by the user for a display.

More specifically, the first information processing means comprises:

first checking means for checking whether the television broadcast signal received for the program being recorded contains the title information, and
   first data processing means for writing the flag to the auxiliary data recording region when the first checking means detects the presence of the title information.

On the other hand, the second information processing means comprises:

playback control means for playing back the tape when the device is manipulated by the user for the display,
   second checking means for checking each program recorded on the tape as to whether the flag is written to the auxiliary data recording region,
   information extracting means for extracting the title information from the predetermined position of the television broadcast signal reproduced from the broadcast signal recording region, every time the second checking means detects the presence of the written flag, and
   second data processing means for preparing and outputting data for visually displaying the title information extracted by the information extracting means.

The video recording device of the invention has an output terminal connected to a monitor.

The device is initiated into a recording operation when manipulated by the user for the start of the recording operation or when the preselected time for starting the recording operation has arrived.

With the start of the recording operation, the first checking means checks whether the television broadcast signal received, for example, via an antenna for the program being currently recorded contains title information. When the first checking means detects the presence of the title information, the first data processing means writes a flag having, for example, a value of "0" or "1" to the auxiliary data recording region of the tape. Since the quantity of information of the flag is small, the flag can be written to the auxiliary data recording region within a very short period of time.

Thus, for the program containing the title information, the television broadcast signal is recorded in the broadcast signal recording region of the tape, and the flag is written to the auxiliary data recording region thereof.

When the user manipulates the device so as to display on the screen of the monitor a list of the titles of the programs recorded on the tape, the playback control means starts to play back the tape.

While the tape is being played back, the second checking means searches the auxiliary data recording region of the tape to check whether the flag is written to the region successively for each of the programs recorded on the tape. The information extracting means extracts the title information from the predetermined position of the television broadcast signal reproduced from the broadcast signal recording region, every time the second checking means detects the presence of the written flag. Since the flag is written for the program which contains the title information among the programs recorded on the tape, the title information is invariably contained in the television broadcast signal reproduced when the written flag is detected by the second checking means.

The second data processing means prepares data for visually displaying the title information extracted by the information extracting means and feeds the data to the monitor. Consequently, the title of the program or the titles of programs containing the title information are each shown for the program on the screen of the monitor.

In the case of the recording device described, the second checking means searches the auxiliary data recording region which is smaller than the broadcast signal recording region in area, with the result that the whole title information recorded in the broadcast signal recording region can be extracted within a shorter period of time than is the case with the recording device described previously wherein the entire broadcast signal recording region is searched. This shortens the time required for completely displaying the list of titles of programs.

Stated more specifically, the first information processing means further comprises:

third data processing means for recording in the auxiliary data recording region recording data representing the contents of recording of the program being recorded when no title information is detected for the program by the first checking means. The recording data includes data relating, for example, to a channel number, recording data, recording starting time and recording termination time.

On the other hand, the second information processing means further comprises:

fourth data processing means for reading from the auxiliary data recording region the recording data as to the recorded program for which the flag is not written every time the second checking means detects the absence of the written flag, and preparing and outputting data for visually displaying the read recording data.

When the first checking means detects the absence of the title information, the third data processing means records the recording data of the program concerned in the auxiliary data recording region.

Thus, for the program containing no title information, the television broadcast signal is recorded in the broadcast signal recording region on the tape, and the recording data in the auxiliary data recording region.

The fourth data processing means reads from the auxiliary data recording region the recording data as to the recorded program for which the flag is not written every time the second checking means detects the absence of the written flag, prepares data for visually displaying the read recording data and feeds the prepared data to the monitor. Consequently, the screen of the monitor displays the recording information as to at least one program containing no title information, for example, the channel number, recording date, recording starting time and recording termination time.

For the program containing the title information, the title of the program is displayed, while for the program containing no title information, the recording information as to the program is displayed in this way.

Stated specifically, the first information processing means further comprises:

fifth data processing means for recording in the auxiliary data recording region recording data representing the contents of recording of the program being recorded when the title information is detected for the program by the first checking means.

On the other hand, the second information processing means further comprises:

sixth data processing means for reading from the auxiliary data recording region the recording data as to the recorded program for which the flag is written every time the second checking means detects the presence of the written flag, and preparing and outputting data for visually displaying the read recording data.

With the device thus constructed, when the first checking means detects the presence of the title information, the first data processing means writes the flag to the auxiliary data recording region as described above, and the fifth data processing means records the recording data concerned to the auxiliary data recording region.

The sixth data processing means reads the recording data concerned from the auxiliary data recording region every time the second checking means detects the presence of the written flag, prepares data for visually displaying the read recording data and feeds the prepared data to the monitor. The information extracting means extracts the title information from the predetermined position of the television broadcast signal reproduced from the broadcast signal recording region, every time the second checking means detects the presence of the written flag as described above. The second data processing means prepares data for visually displaying the title information extracted by the information extracting means and feeds the data to the monitor. Consequently, the screen of the monitor displays the recording information for at least one program containing the title information, in addition to the title.

More specifically, the playback control means rewinds the tape to a starting end thereof at a higher speed than for usual playback and thereafter forwards the tape fast for playback at a higher speed than for usual playback when the device is manipulated by the user for the display, and the playback control means effects usual playback while the information extracting means is in operation.

The playback control means of the device thus constructed plays back the tape from the starting end thereof, so that the title information or recording data is read in the order in which the programs are recorded. Accordingly the titles of the programs or recording information is displayed on the screen of the monitor in the order in which the programs are recorded.

With the device thus constructed, a list of the titles of the programs or of recording information is displayed on the monitor screen when programs recorded on the tape are to be viewed. The list tells the viewer the recording order of the programs, facilitating the retrieval of a particular program.

The playback control means forwards the tape fast for playback at a higher speed than for usual playback except during the operation of the information extracting means. The whole title information recorded in the broadcast recording region can therefore be extracted within a shortened period of time. Since the second checking means searches the auxiliary data recording region which is narrower than the broadcast signal recording region as stated above, the presence or absence of the flag can be reliably detected even if the tape is played back at the higher speed. Further because the tape is played back in the usual manner while the information extracting means is in operation, the title information can be reliably extracted from the television broadcast signal reproduced from the broadcast signal recording region.

The second video recording device of the present invention is adapted to display the titles of the programs recorded on the tape as listed on the monitor screen.

BRIEF DESCRIPTION OF THE DRAWINGS

FIG. 9 is a diagram showing a recording list to be displayed on a TV receiver according to the third embodiment;

DETAILED DESCRIPTION OF EMBODIMENTS

VCRs embodying the present invention will be described below in detail

First Embodiment

Figure 1:
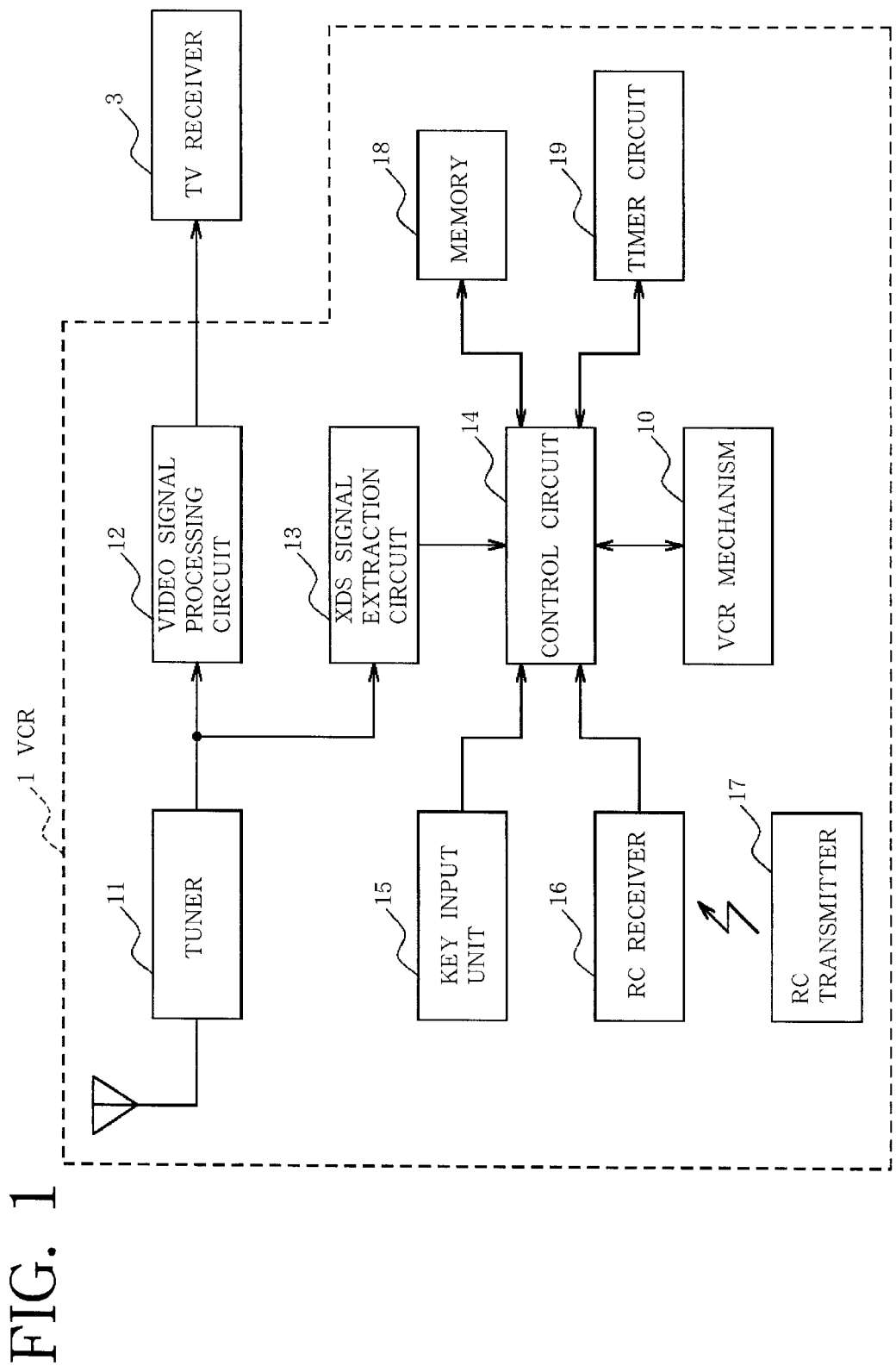
FIG. 1 is a block diagram showing the construction of a VCR as a first embodiment.

With reference to FIG. 1, a VCR 1 of the present embodiment has a tuner 11 for receiving a television broadcast signal. The television signal obtained from the tuner 11 is fed to a video signal processing circuit 12, which prepares a video signal in a specified format and delivers the signal to a TV receiver 3.

On the other hand, a VCR mechanism 10 for the recording video signal on a magnetic tape is controlled by a control circuit 14 comprising a microcomputer.

Connected to the output terminal of the tuner 11 is an XDS signal extraction circuit 13, which extracts an XDS signal superposed on the television broadcast signal. The extracted XDS signal is fed to the control circuit 14.

Connected to the control circuit 14 are a key input unit 15 having a plurality of manual keys, a remote control receiver 16 for receiving a remote control signal from a remote control transmitter 17, a memory 18 for storing information relating to the recording of a preselected program by programming the recorder and input by manipulating the transmitter 17, and a timer circuit 19 for performing a time measuring function.

Figure 2:
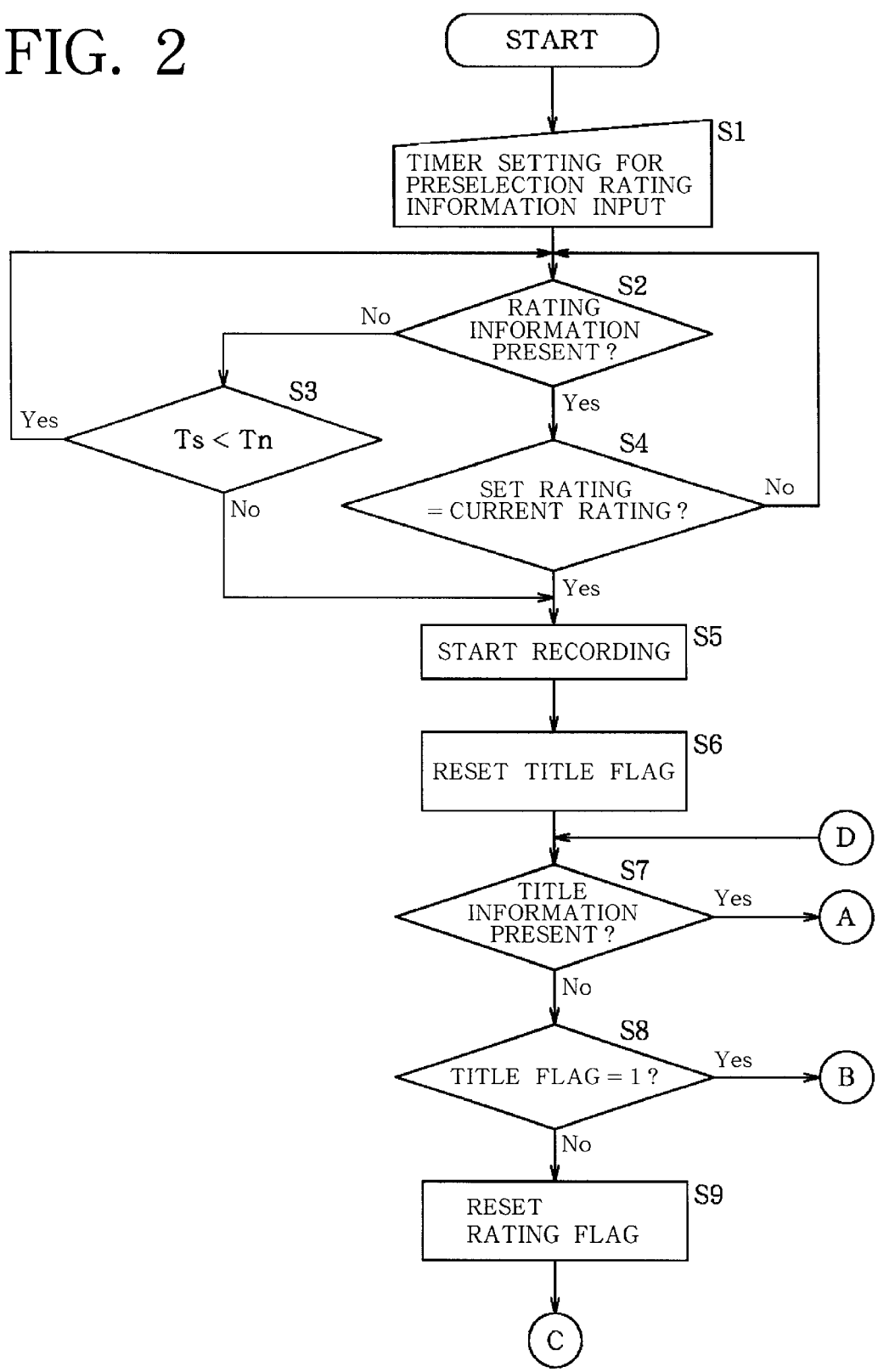
FIG. 2 is a flow chart showing a procedure to be performed by a control circuit included in the first embodiment.
Figure 3:
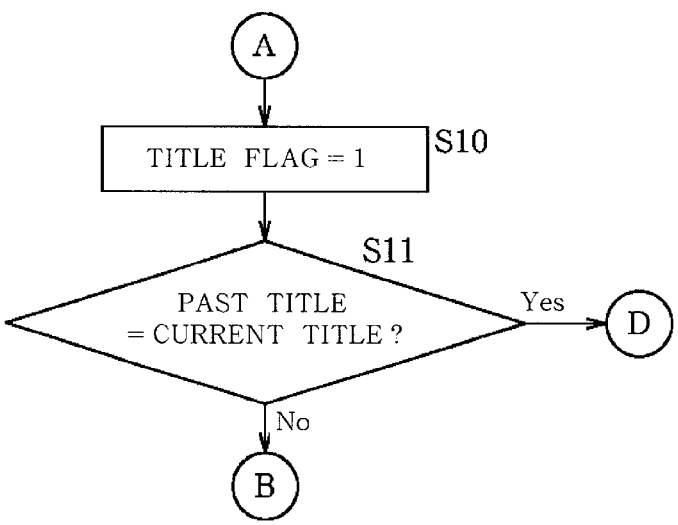
FIG. 3 is a diagram showing part of FIG. 2.
Figure 4:
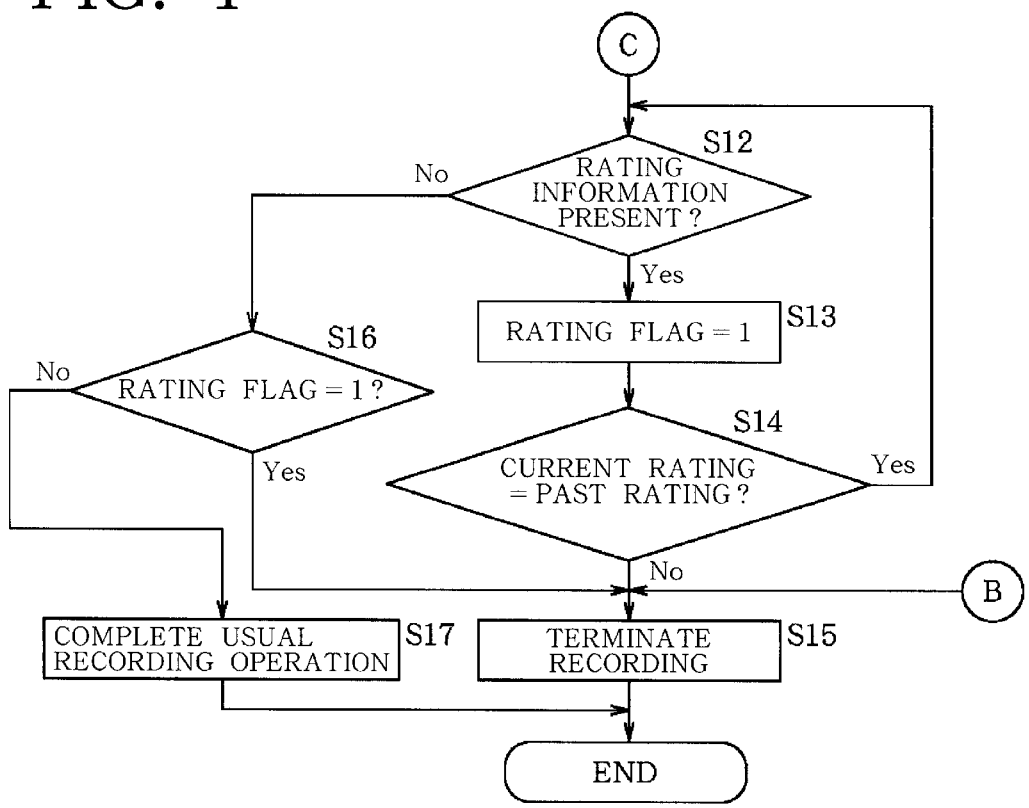
FIG. 4 is a diagram showing another part of FIG. 2.

FIGS. 2 to 4 show a procedure to be performed by the control circuit 14 for controlling the preselected program recording operation.

FIG. 2 first shows step Si for usual timer setting for the preselected program, i.e., for inputting the channel, broadcast starting time, broadcast termination time, recording speed, etc. of the desired program preselected, and also the RATING information as to the program. The RATING information as to programs appears, for example, in newspapers on the page of TV broadcast programs.

The input information is stored in the memory 18.

As the result of inputting, step S2 starts to inquire, five minutes before the broadcast starting time of the program, whether the XDS signal obtained from the extraction circuit 13 contains the RATING information. If the answer is affirmative, step S4 follows, in which an inquiry is made as to whether the RATING information stored matches the RATING information contained in the XDS signal. When the inquiry is answered in the negative, the sequence returns to step S2 to repeat the same inquiries.

Accordingly, before the broadcast of the program to be recorded is actually started, no match is found between the compared pieces of RATING information, and the VCR is held in standby state for recording.

When the broadcast of the program to be recorded is actually started, the stored RATING information is found to match the RATING information contained in the XDS signal, and the inquiry of step S4 is answered in the affirmative.

Step S5 then follows for the start of recording. A title flag is subsequently reset in step S6, and step S7 thereafter inquires whether the XDS signal contains title information. The sequence proceeds to FIG. 3, step S10 if the answer is affirmative.

After the title flag has been set to 1 in step S10, step S11 inquires whether the title information is in match with the current title information. When the answer is affirmative, step S7 of FIG. 2 is resumed to repeat the same inquiries.

Accordingly, before the actual completion of the broadcast of the program being recorded, the title information in the past is in match with the current title information to continue the recording operation.

The broadcast of the program being recorded is then terminated, and broadcast of the next program is started, whereupon the past title information fails to match the current title information, with the result that the inquiry of FIG. 3, step S11 is answered in the negative. FIG. 4, step S15 then follows to terminate the recording operation.

If a negative answer is given to the inquiry of FIG. 2, step S2, with no RATING information found superposed on the XDS signal, step S3 follows to compare the set program broadcast starting time Ts with the current time Tn and inquire whether the time Ts is ahead of the current time Tn. If the answer is affirmative, the sequence returns to step S2 to repeat the same inquiries. When a negative answer is obtained in step S3, step S5 follows to start a recording operation.

In this way, the recording operation of the preselected program by usual timer setting is performed.

In the case where no RATING information is superposed on the XDS signal, a negative answer is given in step S7, followed by step S8.

In step S8 an inquiry is made as to whether the title flag is set to 1. The title flag is found to be set to 1 when the title information is superposed for the program being recorded, with no title information superposed for the next program, so that step S8 is answered in the affirmative, followed by FIG. 4, step S15 for the completion of the recording operation.

On the other hand, if no title information is superposed for the program being recorded, a negative answer is given in step S8, followed by step S9 to reset a RATING flag. The sequence thereafter proceeds to FIG. 4, step S12 to check whether the XDS signal contains the RATING information.

When the RATING information is superposed on the XDS signal, step S12 is answered in the affirmative, followed by step S13 to set the RATING flag to 1. An inquiry is thereafter made in step S14 as to whether the current RATING information is in match with the RATING information in the past. If the inquiry is answered in the affirmative, the sequence returns to step S12 to repeat the same inquiries.

Thus, until the broadcast of the program being recorded is actually completed, the past RATING information is in match with the current RATING information to continue the recording operation.

When the broadcast of the next program is subsequently started on termination of the broadcast of the program being recorded, the past RATING fails to match the current RATING, and a negative answer is given in step S14, followed by step S15 to complete the recording operation.

If no RATING information is superposed on the XDS signal, on the other hand, the inquiry of step S12 is answered in the negative, followed by step S16, in which an inquiry is made as to whether the RATING information is set to 1. In the case where the RATING information is superposed for the program being recorded, with no RATING information superposed for the next program, the inquiry of step S16 is answered in the affirmative. Step S15 then follows to complete the recording operation.

In the case where no RATING information is superposed for the program being recorded, a negative answer is given in step S16. Step S17 then follows for the completion of the usual recording operation, i.e., to complete the recording operation when the preset recording termination time has arrived.

According to the procedure described, the VCR is held in the standby state for recording until the broadcast of the preselected program is started if the start of broadcast of the program becomes later than is scheduled, and the recorder is automatically initiated into a recording operation when the broadcast of the program is actually started.

Further when the termination of broadcast of the program becomes later than is scheduled, the recording operation is continued until the broadcast of the program is actually terminated, and the recording operation is automatically terminated when the broadcast of the next program is started upon the actual termination of broadcast of the program.

Second Embodiment

The VCR of this embodiment is initiated into a recording operation by the usual manual procedure or timer setting and brought out of the recording operation automatically.

The VCR of the present embodiment has a control circuit different from that of the first embodiment in function but otherwise has the same construction as the VCR of the first embodiment shown in FIG. 1.

Figure 5:
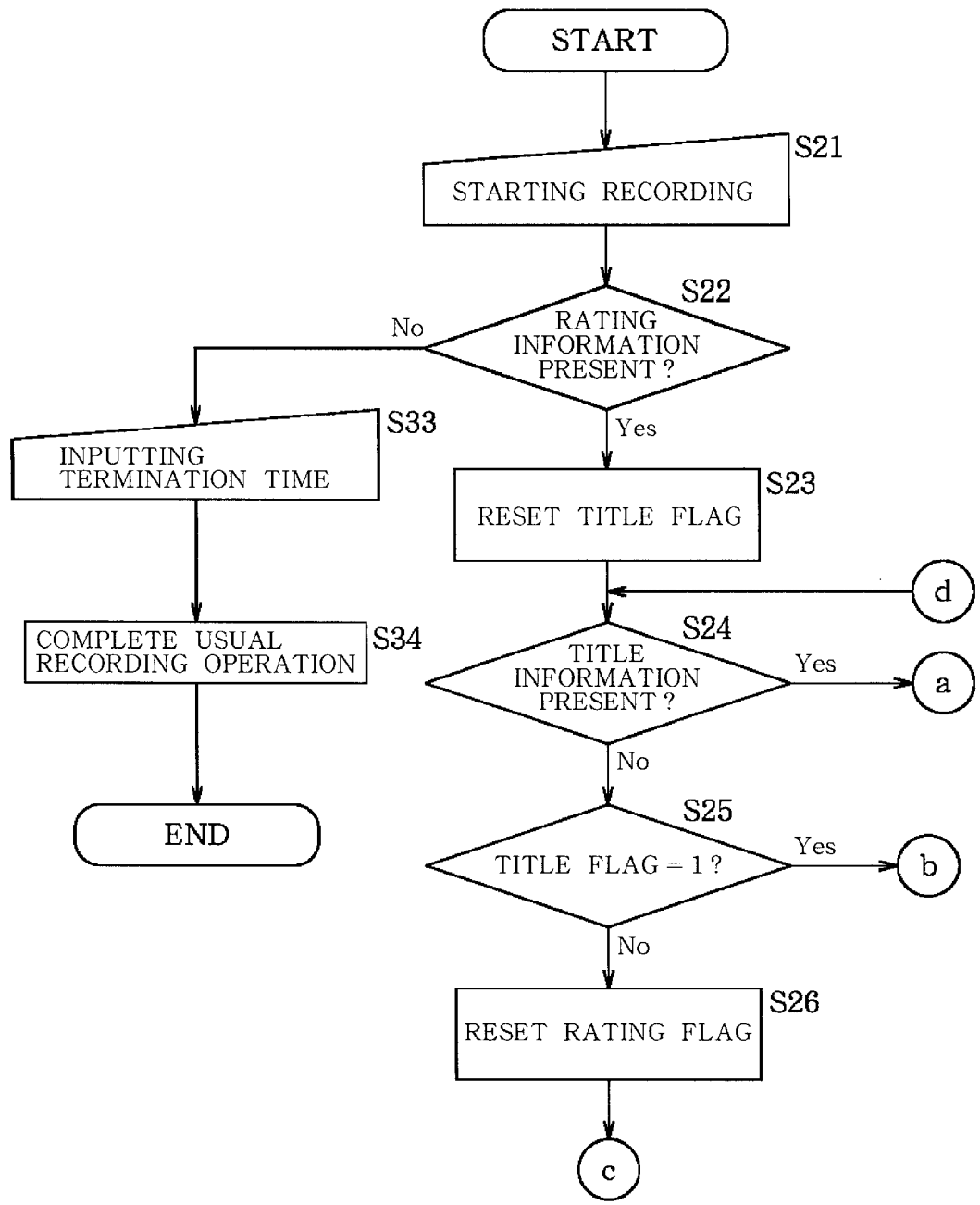
FIG. 5 is a flow chart showing a procedure to be performed by a control circuit included in second embodiment.
Figure 6:
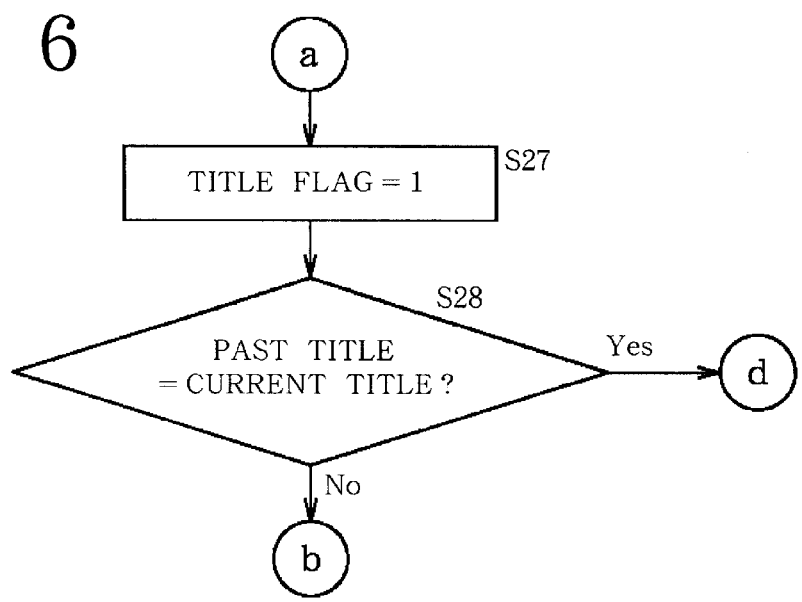
FIG. 6 is a diagram showing part of FIG. 5.
Figure 7:
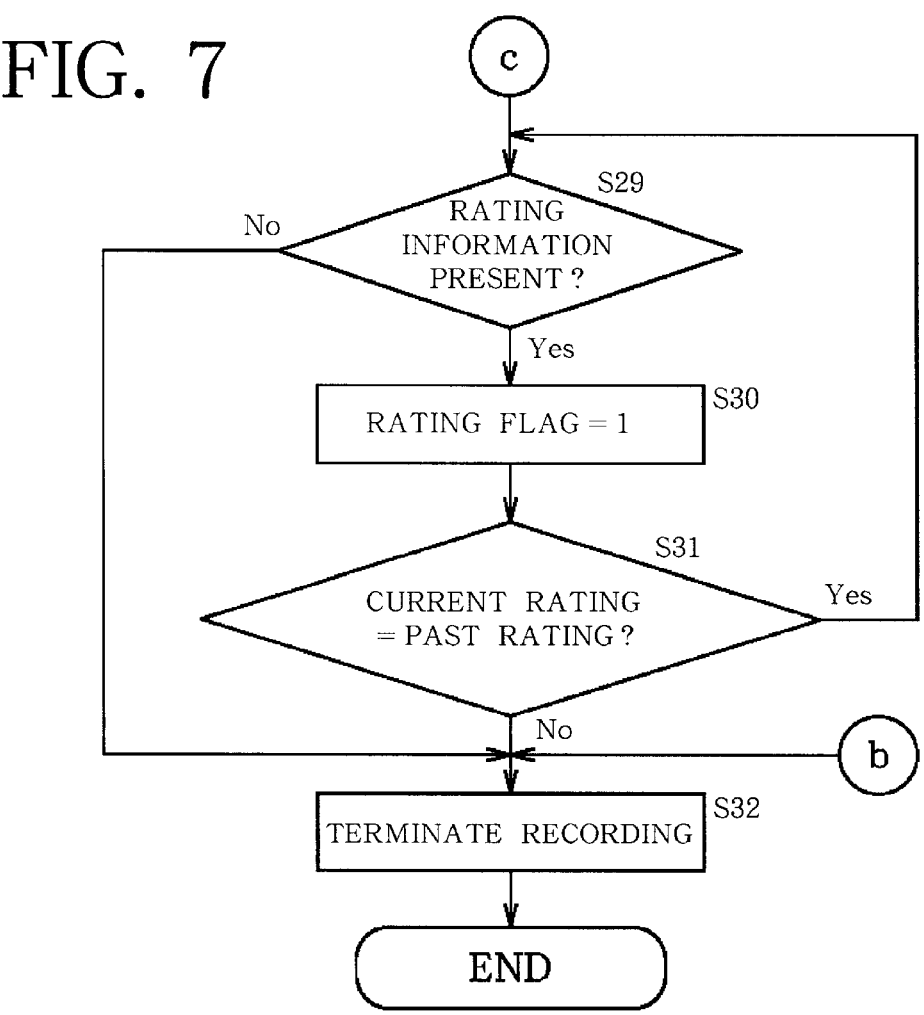
FIG. 7 is a diagram showing another part of FIG. 5.

FIGS. 5 to 7 show the control procedure to be performed by the control circuit of the present embodiment.

First, the recorder is initiated into a recording operation in FIG. 5, step S21, followed by step S22 to inquire whether RATING information is superposed on the XDS signal. If the answer is negative, the sequence proceeds to step S33, urging the user to input the program broadcast termination time. When the termination time is input, step S34 follows to complete the recording operation in the usual manner, i.e., to complete the recording operation when the set broadcast termination time has arrived.

In contrast, if an affirmative answer is given in step S22, step S23 follows, in which a title flag is reset. An inquiry is thereafter made in step S24 as to whether title information is superposed on the XDS signal. If an affirmative answer is given, the sequence proceeds to FIG. 6, step S27.

The title flag is. set to 1 in step S27, followed by step S28 to inquire whether the title information in the past matches the current title information. When the answer is affirmative, the sequence returns to FIG. 5, step S24 to repeat the same inquiries. Accordingly, the past title information is in match with the current title information to continue the recording operation until the broadcast of the program being recorded is actually terminated.

The broadcast of the program being recorded is subsequently terminated, and the broadcast of the next program is started, whereupon the past title information fails to match the current title information, and a negative answer is given in FIG. 6, step S28. The sequence proceeds to FIG. 7, step S32, in which the recording operation is completed.

On the other hand, if no title information is found superposed on the XDS signal, the inquiry of FIG. 5, step S24 is answered in the negative, followed by step S25.

Step S25 inquires whether the title flag is set to 1. When the title information is superposed for the program being recorded, with no title information superposed for the next program, the title flag is 1, so that an affirmative answer is given in step S25. The sequence proceeds to FIG. 7, step S32 to complete the recording operation.

In contrast, if no title flag is superposed for the program being recorded, a negative answer is given in step S25, followed by step S26 to reset a RATING flag. FIG. 7, step S29 then follows to inquire whether the RATING information is contained in the XDS signal.

When the RATING information is superposed on the XDS signal, the inquiry of step S29 is answered in the affirmative, followed by step S30, in which the RATING flag is set to 1. An inquiry is thereafter made in step S31 as to whether the RATING information in the past matches the current RATING information. When an affirmative answer is given, the sequence returns to step S29 to repeat the same inquiries.

Accordingly, the past RATING information is in match with the current RATING information to continue the recording operation until the broadcast of the program being recorded is actually terminated.

The broadcast of the program being recorded is subsequently terminated, and the broadcast of the next program is started, whereupon the past RATING information fails to match the current RATING information, and a negative answer is given in step S31. The sequence proceeds to step S32, in which the recording operation is completed.

On the other hand, no RATING information is superposed for the program next to the program being recorded, a negative answer is given in step S29, followed by step S32 to complete the recording operation.

Even if the program broadcast termination time becomes later than is scheduled, the recording operation is continued until the broadcast of the program is actually terminated, and the recording operation is automatically completed when the next program is started upon actual termination of the preceding program according to the procedure described.

The user needs only to manipulate the recorder for the start of recording operation, and there is no need for a recording completion manipulation.

Third Embodiment

The VCR 2 of this embodiment can be set in a title display mode in which a recording list shown in FIG. 9 can be displayed for the programs recorded on a magnetic tape. With reference to FIG. 9, "CH" refers to channel number, "DATE" to recording date, "START" to recording stating time, "END" to recording termination time, and "TITLE" to the title of program.

Figure 8:
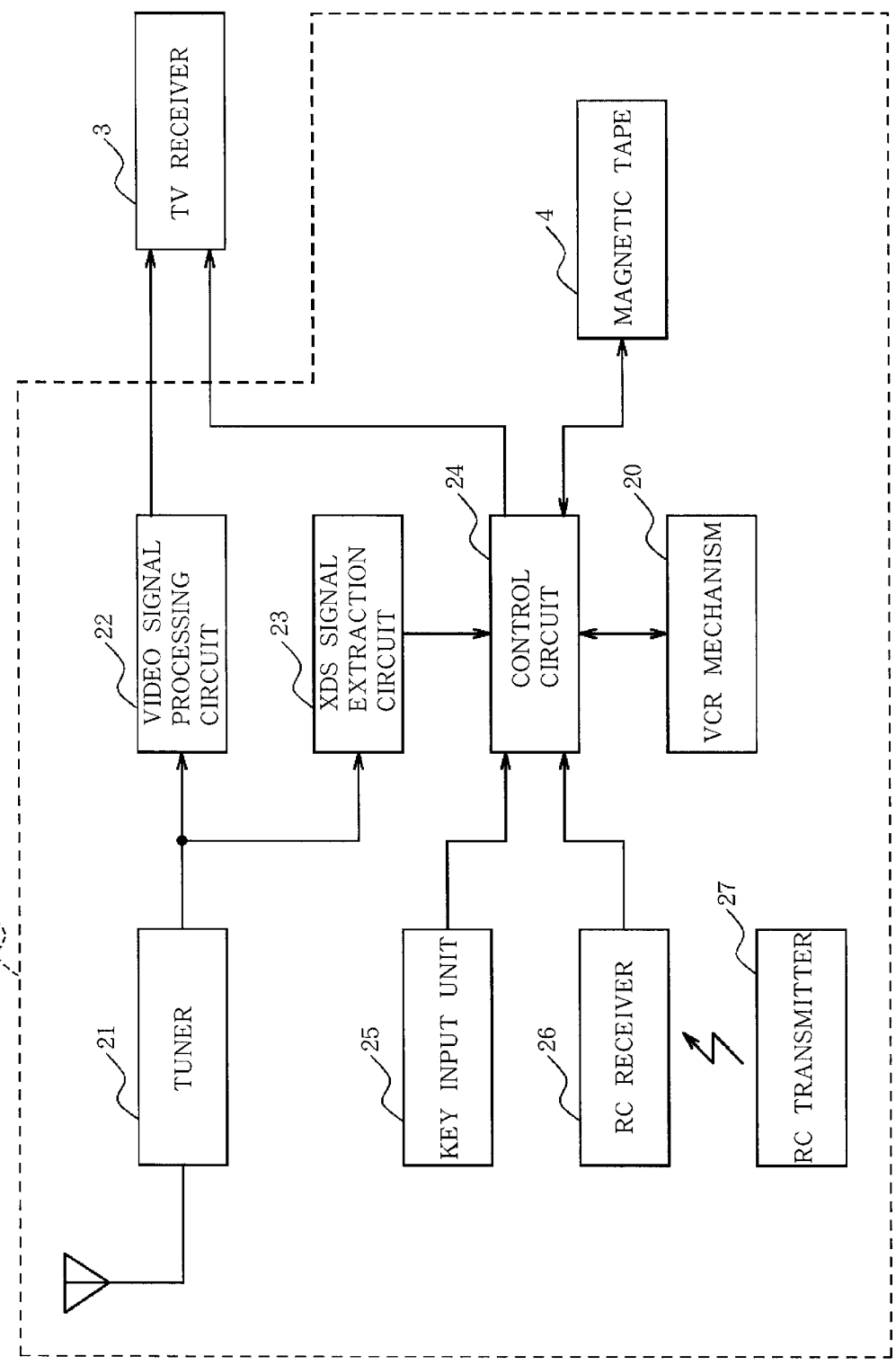
FIG. 8 is a block diagram showing the construction of a VCR as a third embodiment.

With reference to FIG. 8, the VCR 2 of the present embodiment has a tuner 21 for receiving a television broadcast signal. The television signal obtained from the tuner 21 is fed to a video signal processing circuit 22, which prepares a video signal in a specified format and delivers the signal to a TV receiver 3.

Connected to the output terminal of the tuner 21 is an XDS signal extraction circuit 23, which extracts an XDS signal superposed on the television broadcast signal. The extracted XDS signal is fed to a control circuit 24 comprising a microcomputer.

Connected to the control circuit 24 are a magnetic tape 4 and a VCR mechanism 20 for recording the video signal on the tape 4. The VCR mechanism 20 is controlled by the control circuit 24.

Also connected to the control circuit 24 are a key input unit 25 having a plurality of manual keys, and a remote control receiver 26 for receiving a remote control signal from a remote control transmitter 27.

When a command to display the recording list is given by the key input unit 25 or the remote control transmitter 27, the title information display signal and recording information display signal to be described below are prepared in succession by the control circuit 24 and fed to the TV receiver 3.

Figure 12:
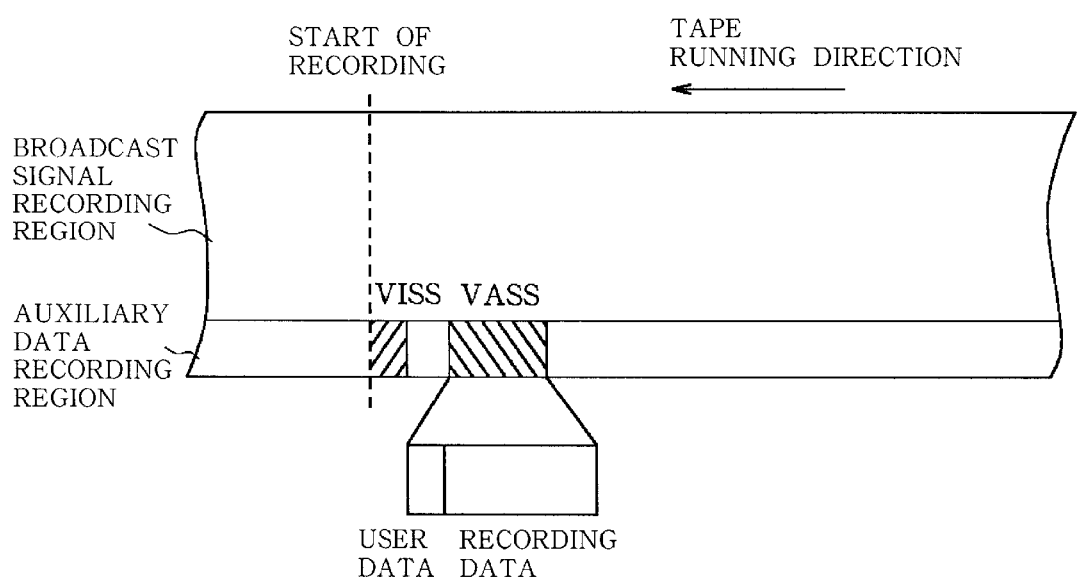
FIG. 12 is a diagram showing the signal recording format of a magnetic tape according to the third embodiment.
Figures 13, 14:
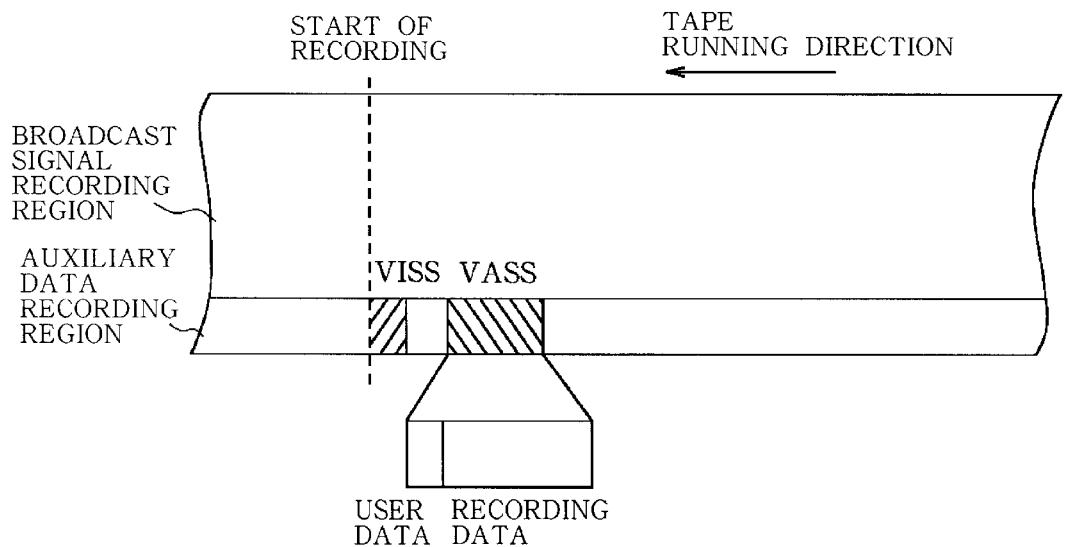
FIG. 13 is a diagram showing the signal recording format of a conventional magnetic tape.
FIG. 14 is a diagram showing a conventional recording list.

FIG. 12 shows the signal recording format of the magnetic tape 4 for use in the VCR 2 of the present embodiment.

For use in the VCR 2 of present embodiment, the magnetic tape 4 is provided thereon with a recording region for the television broadcast signal and a recording region for recording auxiliary data as illustrated. Recorded in the auxiliary data recording region after the start of recording are first VISS (video index signal search) data representing the recording starting time as superposed on a control signal, and subsequently VASS (video address signal search) data to be described below and including user data and recording data representing the contents of the recording.

Figure 10:
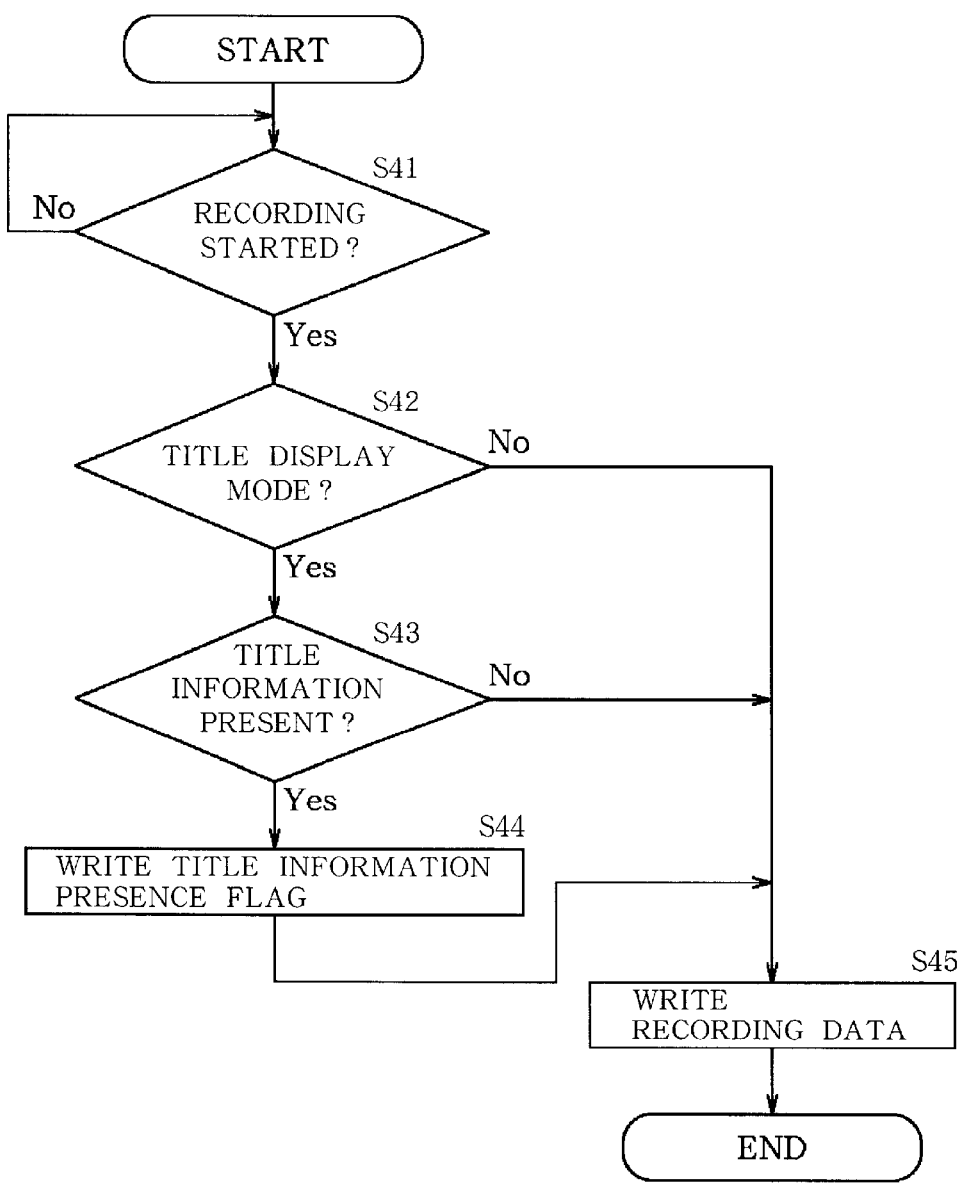
FIG. 10 is a flow chart showing a procedure for writing VASS data.

FIG. 10 shows the characteristic feature of the present embodiment, i.e., a VASS data writing procedure to be performed by the control circuit 24 during recording.

As illustrated, step S41 first inquires whether recording is started. If the answer is negative, the inquiry of step S41 is repeated, whereas if the answer is affirmative, step S42 follows.

An inquiry is made in step S42 as to whether the recorder is set in the title display mode. When the answer is negative, step S45 follows, in which the recording data as to the program currently being recorded is written to the VASS data recording section of the magnetic tape 4 shown in FIG. 12 as in the prior art to complete the procedure.

On the other hand, if an affirmative answer is obtained in step S42, step S43 follows to inquire whether title information is contained in the XDS signal obtained from the XDS signal extraction circuit 23. The inquiry step S43 is performed for about 5 seconds after the VISS data has been written to the VISS data recording section as shown in FIG. 12.

If a negative answer is given in step S43 of FIG. 10, the sequence proceeds to step S45 to write the recording data to the recording data recording area of the VASS data recording section as described above to complete the procedure.

When an affirmative answer is obtained in step S43, step S44 follows, in which a title information presence flag having, for example, a value of "0" or "1" is written to the user data recording area in the VASS data recording section of the magnetic tape 4 shown in FIG. 12. The sequence thereafter proceeds to step S45 to write the recording data to the recording data recording area of the VASS data recording section as described above to complete the procedure.

With the VCR 2 of the present embodiment, the forgoing procedure is performed to record the television broadcast signal in the broadcast signal recording region of the magnetic tape 4 and to write the title information presence flag and the recording data to the VASS data recording section in the auxiliary data recording region, for the program for which the XDS signal contains the title information. For the program for which the XDS signal contains no title information, the television broadcast signal is recorded in the broadcast signal recording region of the tape 4, and the recording data only is written to the VASS data recording section of the auxiliary data recording region.

Figure 11:
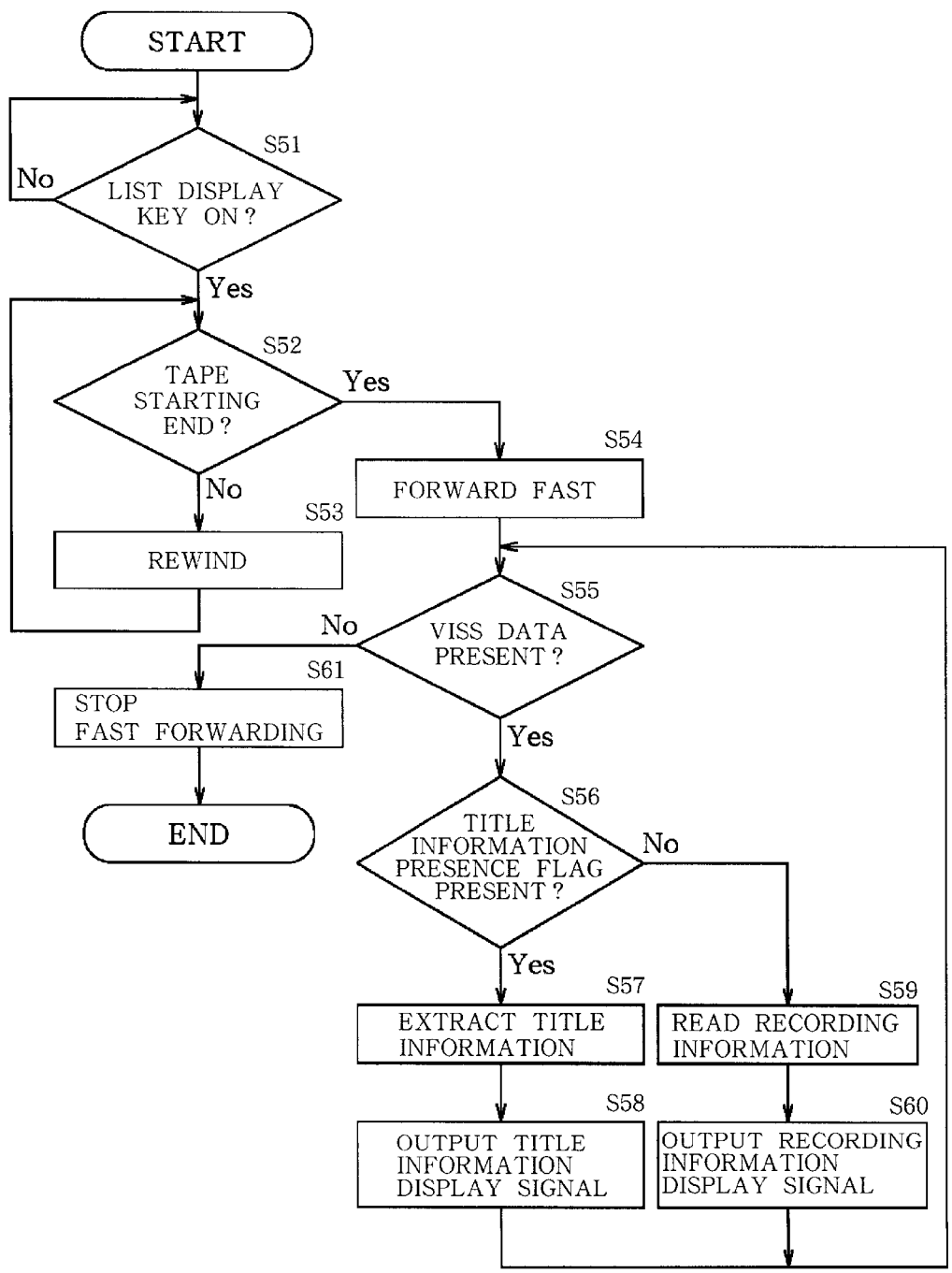
FIG. 11 is a flow chart showing a procedure for displaying the recording list.

FIG. 11 shows the recording list display procedure to be performed by the control circuit 42 of the present embodiment. Incidentally, the key input unit 25 and the remote control transmitter 27 of the present embodiment have a list display key (not shown) for use in displaying the recording list of FIG. 9.

As illustrated, an inquiry is made first in step S51 of FIG. 11 as to whether the list display key is depressed. When the key is depressed by the user to display the recording list on the screen of the TV receiver 3, an affirmative answer is given, whereupon the sequence proceeds to step S52. If a negative answer is obtained in step S51 on the other hand, the inquiry step S51 is repeated.

Step S52 inquires whether the magnetic tape 4 set in the VCR 2 has been rewound to the starting end. When a negative answer is given, step S53 follows to start a tape rewinding operation. Step S52 then follows again.

With the magnetic tape 4 rewound to the starting end, step S52 is answered in the affirmative, followed by step S54 to start to forward the tape 4 fast.

An inquiry is then made in step S55 as to whether the VISS data is recorded in the auxiliary data recording region on the magnetic tape 4. If the answer is affirmative, step S56 follows to inquire whether the title information presence flag is written to the user data area in the VASS data recording section of the tape 4.

When an affirmative answer is obtained in step S56, step S57 follows to extract the title information from the 21th horizontal section of the vertical blanking period in the second field of the television broadcast signal reproduced from the broadcast signal recording region of the tape 4. At this time, the tape 4 is played back in the usual manner only for a specified period of time.

Subsequently in step S58, a title information display signal is prepared based on the extracted title information and fed to the TV receiver 3. The sequence then returns to step S55. As a result, the title of the program recorded on the tape 4 is displayed on the screen of the TV receiver 3 as shown in FIG. 9. For example when a program with the title of "soccer" is recorded, "SOCCER" is displayed in the column of "TITLE."

On the other hand, if a negative answer is given in step S56, step S59 follows to read the recording data from the recording data recording area in the VASS data recording region on the tape 4. A recording information display signal is prepared with reference to the read recording data and output to the TV receiver 3 in step S60, whereupon the sequence returns to step S55. Consequently shown on the screen of the TV receiver 3 is the recording data as to the program recorded on the tape 4, e.g., the channel number, recording date, recording starting time and recording termination time as shown in FIG. 9. For example, a program on channel 15 is recorded during the period of 7:00 p.m. to 8:00 p.m. on November, 24th, "15," "11/24," "7:00 PM" and "8:00 PM" are given in the respective columns of "CH," "DATE," "START" and "END."

In this way, the screen of the TV receiver successively shows the titles of the programs for which the title information is contained in the XDS signal among the programs recorded on the magnetic tape 4, and the recording information as to the programs for which no title information is present.

When the titles or recording information has been displayed for all the programs recorded on the tape 4, the inquiry of step S55 is answered in the negative, whereupon step S61 follows to stop forwarding the tape 4 fast to complete the procedure.

The VCR 2 of the present embodiment is adapted to display the program titles in the recording list shown in FIG. 9 in connection with the programs for which the XDS signal contains the title information, consequently enabling the user to readily recognize what a particular program is about.

Since the magnetic tape 4 is forwarded fast for playback except while the control circuit 24 is in title information extracting operation, the title information or recording information relating to all the programs recorded on the tape 4 can be read within a short period of time. This reduces the time required for completely displaying the recording list. The control circuit 24 of the present embodiment searches the narrow auxiliary data recording region, so that even if the tape 4 is forwarded fast for playback, the presence or absence of the title information presence flag can be detected reliably. Further because the tape 4 is played back in the usual manner while the control circuit 24 is in title information extracting operation, the title information can be reliably extracted from the television broadcast signal reproduced from the broadcast signal recording region.

The tape 4 is forwarded fast for playback first at its starting end. The titles of the programs or recording information relating thereto is therefore displayed on the screen of the TV receiver 3 in the program recording order. Accordingly the recording list indicates the recording order, ensuring facilitated retrieval of the desired program to be viewed and recorded on the tape 4.

The foregoing description of the embodiments is intended to illustrate the present invention and should not be construed as limiting the invention defined in the appended claims or restricting the scope thereof. The device of the invention is not limited to the above embodiments in construction but can of course be modified variously without departing from the spirit of the invention set forth in the claims.

For example according to the third embodiment, the screen of the TV receiver displays only the title of the program for which the title information is present among the programs recorded on the magnetic tape, whereas the recording information can also be displayed in addition to the title.

Although the recording information or the titles of the programs recorded on the tape are successively displayed for each of the program according to the third embodiment, the device can be so designed that the recording information or the titles of all the programs on the tape are displayed at a time.

What is claimed is:

1. A video recording device for recording on a recording medium television broadcast signals having viewing prohibition information superposed thereon for each program, the device comprising:

means for receiving television broadcast signals, information separating means for separating the viewing prohibition information from the television broadcast signal, received, input means for inputting information required for unattended recording of a preselected program, storage means for storing the input information, and recording start control means for comparing viewing prohibition information input by manipulating the input means with the viewing prohibition information separated from the television broadcast signal and starting a recording operation when a match is found between the compared pieces of information, wherein the television broadcast signal contains title information superposed thereon for each program, and the information separating means is capable of separating the viewing prohibition information and the title information from the received television broadcast signal, and which comprises information checking means for checking the separated viewing prohibition information and/or title information for a change, and recording termination control means for terminating the recording operation when a change is found in the viewing prohibition information and/or title information separated from the television broadcast signal during recording after the start of the recording operation.

2. A video recording device for recording on a recording medium television broadcast signals having viewing prohibition information and title information superposed thereon for each program, the device comprising:

means for receiving television broadcast signals, information separating means for separating the viewing prohibition information and the title information from the television broadcast signal received, information checking means for checking the separated viewing prohibition information and/or title information for a change, and recording termination control means for terminating a recording operation when a change is found in the viewing prohibition information and/or title information separated from the television broadcast signal during recording after the start of the recording operation.

3. A video recording device according to claim 1 wherein the viewing prohibition information is RATING information contained in an XDS signal.

* * * * *

UNITED STATES PATENT AND TRADEMARK OFFICE
CERTIFICATE OF CORRECTION

PATENT NO. : 6,636,688 B1  Page 1 of 1
DATED : October 21, 2003
INVENTOR(S) : Hiroshi Otana It is certified that error appears in the above-identified patent and that said Letters Patent is hereby corrected as shown below:

<u>Column 14,</u>
Line 36, please remove comma between "signal" and "received,".

Signed and Sealed this

Twenty-second Day of June, 2004

JON W. DUDAS
*Acting Director of the United States Patent and Trademark Office*